United States Patent [19]

Reindl

[11] Patent Number: 4,935,940
[45] Date of Patent: Jun. 19, 1990

[54] INTERFERENCE-PROOF RECEPTION OF RADIO SIGNALS USING FREQUENCY HOPPING TECHNIQUES

[75] Inventor: Adolf Reindl, Asbury Park, N.J.

[73] Assignee: The United States of America as represented by the Secretary of the Army, Washington, D.C.

[21] Appl. No.: 643,295

[22] Filed: May 24, 1967

[51] Int. Cl.$^5$ .......................................... H04L 9/00
[52] U.S. Cl. ......................................... 375/1; 375/45; 375/58; 375/91; 375/100; 380/34
[58] Field of Search .................. 325/30, 33, 35, 63, 325/320, 432; 340/171; 375/1, 45–51, 58, 88, –91, 99, 100, 80; 380/34, 38, 46

[56] References Cited
U.S. PATENT DOCUMENTS 2,897,269  7/1959  Alphenaar et al. ................... 375/80

Primary Examiner—Stephen C. Buczinski
Assistant Examiner—Bernarr Earl Gregory
Attorney, Agent, or Firm—Michael Zelenka

[57] ABSTRACT

Two interference-proof techniques are shown for detecting binary radio signals transmitted by frequency hopping techniques. In the first, the decision as to which type of binary signal is being received is made by first comparing the energy on each mark and space channel with the energy contents of the same channels during a preceding baud which is blank except for jamming and interference, thus obtaining mark and space energy differences. The larger of these differences determines the type of signal received. In the other technique, the energy contents of both mark and space channels are compared with the energies received simultaneously on a nearby blank channel.

9 Claims, 2 Drawing Sheets

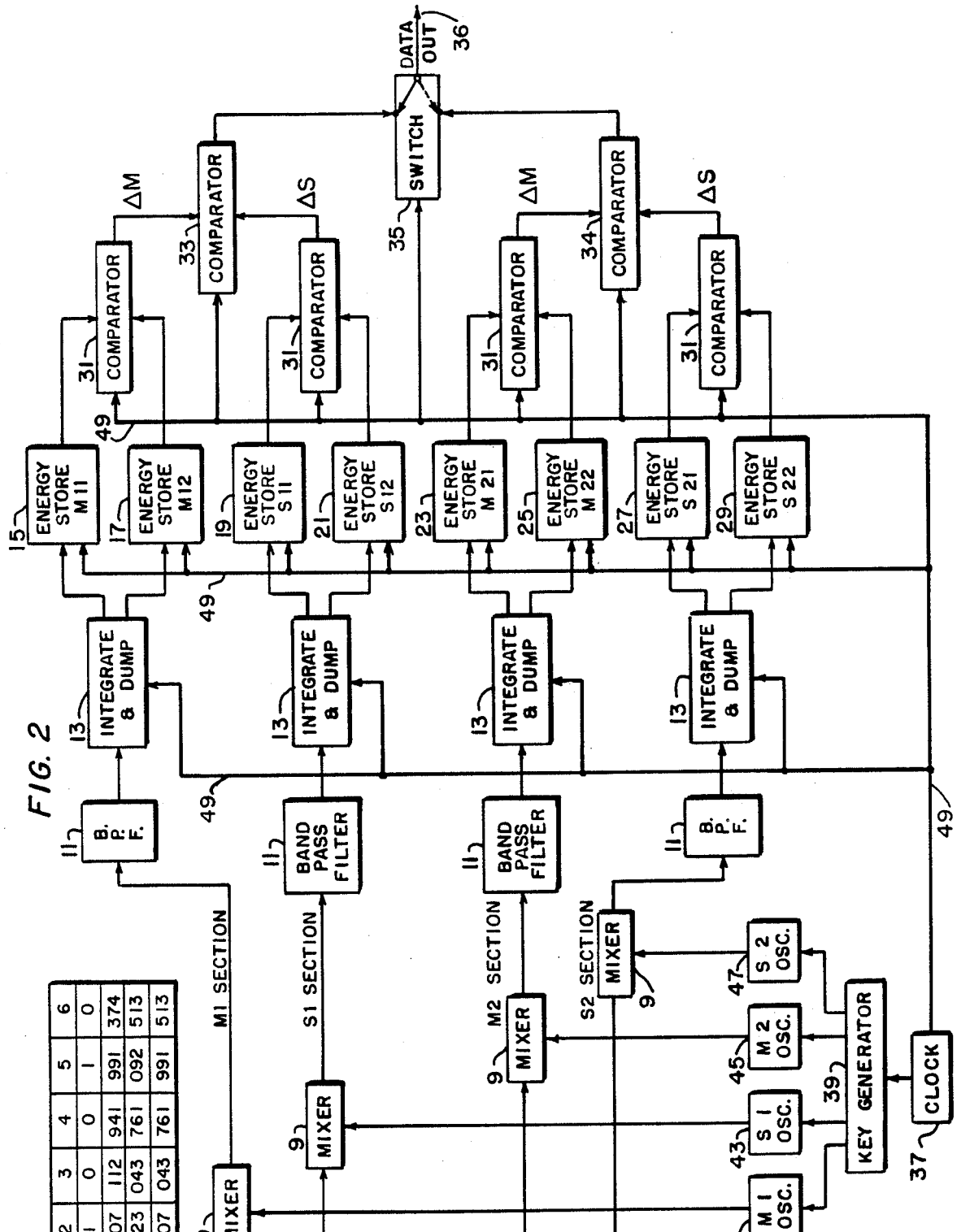

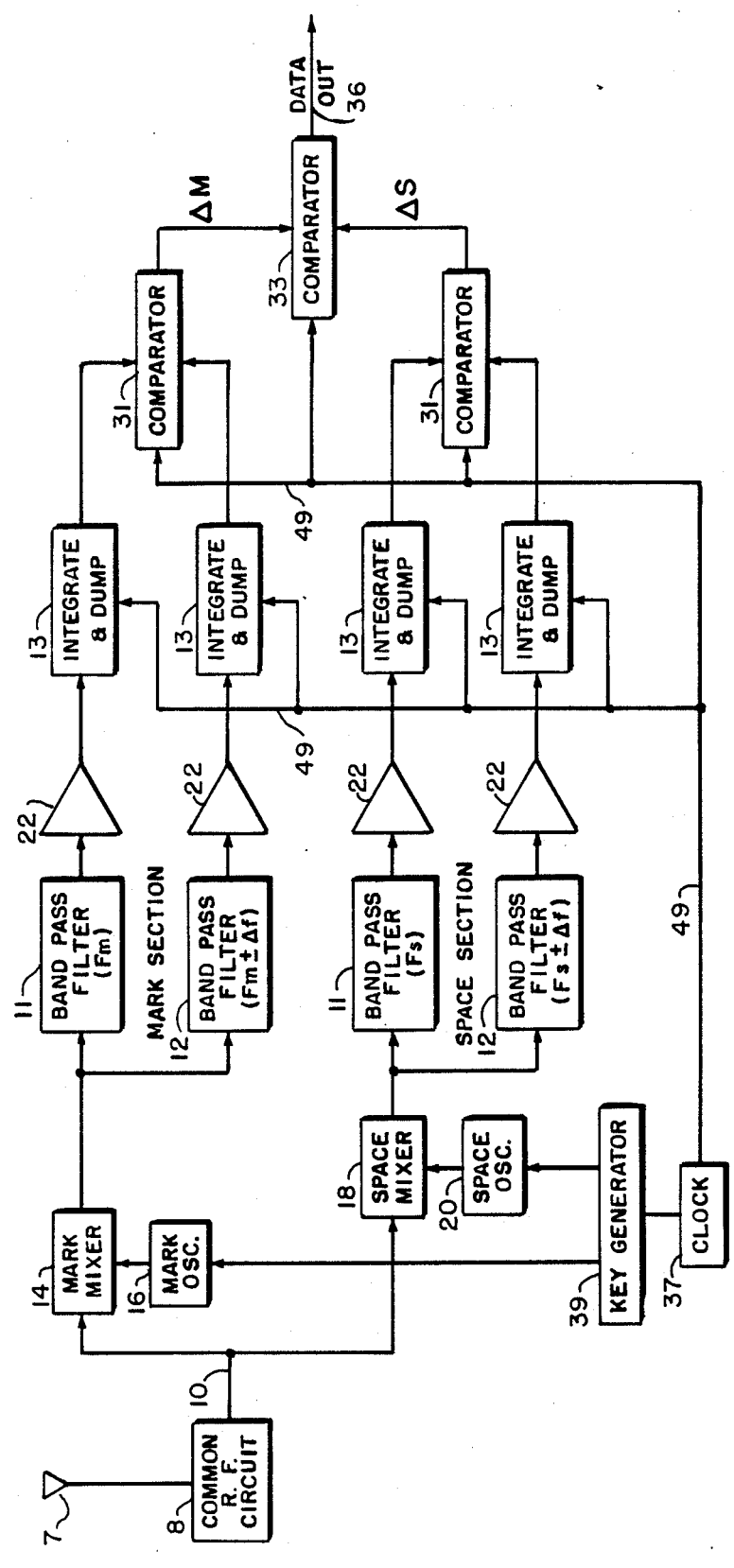

INTERFERENCE-PROOF RECEPTION OF RADIO SIGNALS USING FREQUENCY HOPPING TECHNIQUES

This invention relates to a method and means of reception of radio signals which is immune to a wide variety of jamming techniques, and will provide complete immunity to certain common interference or jamming signals usually encountered in tactical military operations. The invention is applicable to communication systems of the type in which coded data or intelligence is transmitted in a special form of frequency shift keying known as frequency hopping. In ordinary frequency shift keying (FSK), one mark and one space frequency are provided. The information or data to be transmitted is converted to binary form in accordance with the code which characterizes the system and the binary signal is then used to modulate the transmitted frequency. The receiver in such a system includes two channels, one tuned to the mark (or binary 1) frequency and another to the space (or binary 0) frequency, and the relative amplitude at the outputs of these channels determines the type of binary signal being received. In a modification of such a basic FSK system adapted to provide for secret communications, the mark and space frequencies are continually changed according to a pseudo-random code or sequence. This pseudo-random sequence is known to friendly receivers and the tuning of the receiver mark and space channels is continually shifted in synchronizm with the pseudo-random variations of the transmitted mark and space frequencies, thus enabling these friendly receivers to decode the transmission. Such a technique is known as frequency hopping. While an unauthorized or enemy receiver cannot read such a transmission without knowledge of the pseudo-random code, enemy jamming can often garble reception, thus making the transmission unavailable to friendly receivers. The present invention comprises a method and means by which friendly receivers in such frequency hopping systems may avoid the consequences of most types of enemy jamming as well as natural interference and hence provide interference-proof reception of these signals. The basic concept of this invention involves two main aspects. According to the first aspect, the decision as to which type of signal is being received is made not by comparing the energy contents of the mark and space channels as in the prior art, but rather by first comparing the energy contents of each channel during the blank time slot or baud prior to the actual transmission with the energy during the current baud when transmission is expected on these mark and space channels. These comparisons are made by taking the absolute value of the energy difference between the current mark channel or frequency and the stored value of the energy of the same channel during the preceding blank baud. The same comparison is made on the space channel between the energy of the current and preceding baud. This results in mark and space energy differences which are then compared and the larger of the two energy differences determines the type of received signal. With the jamming energy on any arbitrary channel or frequency approximately constant during the duration of two successive bauds, or changing at the same rate during two successive bauds, this technique yields the correct bit, irrespective of whether the desired signal causes phase cancellation of the jamming signal or superposition of amplitude. The other aspect of the invention comprises a technique which may be used alternately or in combination with the first aspect and comprises a detection technique in which the energy contents of both mark and space channels are compared with the energies in a nearby blank channel during the current baud. This technique is preferred where the fluctuation of jamming or noise between adjacent bauds is substantial and this technique can be implemented with simpler circuitry.

It is thus an object of this invention to provide interference and jam-proof reception of radio signals.

Another object is to provide an interference-proof method of detection for binary signals which are transmitted in the frequency hopping mode.

A further object of the invention is to provide novel circuitry capable of detecting binary type radio signals in the presence of intentional jamming or natural atmosphere noise.

These and other objects of the invention will become apparent from the following detailed description and drawings, in which:

FIG. 1 is a table illustrating the principle of frequency hopping transmission.

FIG. 2 is a bblock diagram of receiving circuitry illustrating the first aspect of the invention and FIG. 4 is a block diagram illustrating the second aspect of the invention.

FIG. 3 is a table illustrating the operation of the circuitry of FIG. 2.

The table of FIG. 1 illustrates how certain binary data would be transmitted in the frequency hopping mode. The data comprises six bauds or time slots, each containing one binary data bit. The data comprises the binary sequence 110010. The rows labelled 'key' give the channel code used for transmission of the data during each of the six bauds. For example during the first baud a mark or 1 data bit would be transmitted on channel 614 and a space or 0 data bit on channel 011. The channels represent the frequency at which the data is transmitted. The transmitter is provided with a key generator which provides the pseudo-random sequence of channels which determines the frequency at which each bit is transmitted. The transmitter frequency is thus jointly controlled by the output of the key generator and the binary signal to be transmitted. The receiver also contains a key generator synchronized with that of the transmitter which produces the same pseudo-random sequence as the transmitter key generator. Thus the receiver key generator in effect tells the receiver on which two channels the data is to be expected during each baud. The receiver tuning is automatically controlled by the key generator so that it is tuned to the proper mark and space frequencies during each baud. The last row of FIG. 1 indicates the frequencies or channels on which the data of row two would be transmitted.

The circuitry of FIG. 2 includes common RF circuitry 8 which is broadly tuned to receive and amplify the entire band of frequencies on which the data may arrive. The output 10 of the RF circuitry is connected in parallel to the inputs of four mixers 9 which form part of four different sections to which the incoming signals are applied. The four sections are labelled M1, S1, M2, and S2. Each of these sections comprises a bandpass filter 11 connected to the output of the mixer thereof and an integrate and dump filter 13 connected to the output of the bandpass filter thereof. The contents of each integrate and dump filter may be selectively applied to one or the other of two energy stores (15, 17, 19, 21, 23, 25, 27, & 29) connected to the output thereof. Each such pair of energy stores is connected to a comparator circuit 31. The outputs of the comparator circuits 31 of the M1 and S1 sections are applied to the inputs of comparator circuit 33 and similarly the two comparator circuits 31 of the M2 and S2 channels are connected to the inputs of comparator circuit 34. The binary data output is alternately obtained from the outputs of comparators 33 and 34 by means of switch 35 which is controlled by the output of clock 37 fed thereto over lead 49. The clock output is also applied as a control or synchronizing signal to all of the integrate and dump circuits 13, all of the energy stores, and to all of the comparators. The local oscillator signals are provided by the four oscillators 41, 43, 45 and 47 each of which is connected to a different one of the four mixers. The frequency of the oscillators is controlled by the key generator 39 in which the pseudo-random code or sequence characteristic of the system is stored. The operation of the key generator is synchronized and controlled by the clock 37 which may be a high precision atomic clock which is started in synchronizm with a similar clock at the transmitter. The key generator changes the frequencies of the four oscillators in such a manner that desired channels or frequencies in the output of the RF circuitry appear at the outputs of the four bandpass filters 11 at the proper times. The bandpass filters 11 are analogous to the intermediate frequency filters of a superheterodyne radio receiver. All of these filters may be tuned to the same frequency and all have bandwidths equal to the width of each of the channels on which the data arrives. Assuming that the filters 11 are tuned to the frequency difference between the local oscillator frequency of the particular section and the desired channel in the output of the RF circuitry, then the local oscillator tuning would be set by the key generator to that of the desired channel plus the tuning of the bandpass filter of that particular section. With the four sections of FIG. 2, four different channels or frequencies can be examined simultaneously. During any given baud, two of the four sections are examining the channel assignments of the current baud while the other two sections are tuned to the channel assignments of the next future baud, which in the absence of interference or jamming would be blank. Thus during alternate bauds, for example during all odd numbered bauds, the M1 and S1 sections are examining the channels or frequencies assigned to the next future baud and storing the values thereof. During the succeeding or all even numbered bauds, the M1 and S1 oscillators remain unchanged in frequency and will therefore be tuned to the current channel assignments during these even numbered bauds and the response thereto is compared with that obtained from the previously stored response during the odd numbered bauds. Simultaneously, the M2 and S2 sections, during the even numbered bauds are tuned to the channel assignments of the next future baud and the responses thereto are likewise stored for future comparison. During all odd numbered bauds the M2 and S2 oscillators are tuned to the current channel assignments and these received signals are compared with the values stored from the preceding even numbered baud. Thus the pairs of sections M1 and S1 and M2 and S2 alternate in examining the current or the next succeeding channel assignment and each of the oscillators 41, 43, 45 and 47 remain tuned to the same frequency for two successive bauds. The operation of the circuit of FIG. 2 and the steps of the detection method are illustrated by the table of FIG. 3. This table shows in the second and third rows the key or channel assignments during each of five adjacent bauds, labelled from 1 thru 5. The last four rows labelled M1, S1, M2 and S2 show the tuning of the different sections during the seven different bauds indicated in row one. Thus during baud 1, the oscillator 41 (M1) would be tuned to such a frequency that channel 901 would appear at the output of the bandpass filter 11 of the M1 section. Similarly, during baud 1, the S1 section would be tuned to channel 881, the M2 section to channel 412, and the S2 section to channel 013. It is necessary to actuate the receiving circuitry of FIG. 2 one time slot or baud in advance of the first anticipated data bit. This zeroeth baud is indicated by the column 0 of FIG. 3. During this 0 baud the M1 and S1 sections are not active and the M2 and S2 sections are tuned to channels 412 and 013, which are the mark and space assignments, respectively, of the next or first baud. During baud 0, any energy received on these channels will be integrated by the circuits 13 of the M2 and S2 sections and at the end of the baud will be transferred or dumped into one of the energy stores associated with these sections. The dumping operation is controlled by the clock output applied over lead 49. The integrated energy of the M2 section is put in energy store M21 and that of the S2 section in the energy store S21 at the end of baud 0. During baud 1 the tuning of the M2 and S2 sections remains unchanged, whereas the M1 and S1 sections are now tuned to the mark and space channel assignments of baud 2, or channels 901 and 881. The M2 and S2 sections are now tuned to the current channel assignments and at the end of baud 1, the integrated energy of the M2 section is dumped into energy store M22 and that in the S2 section into energy store S22. The comparator 31 of the M2 section is now actuated by a clock pulse and compares the energy in store M21 to that in M22 and puts out a signal $\Delta M$ equal to the absolute value of the difference between the energy in these two energy stores. The comparator 31 of the S2 section performs a similar operation with the contents of energy stores S21 and S22 to yield a signal $\Delta S$. Simultaneously, the comparator circuit 34 compares $\Delta M$ and $\Delta S$ and puts out either a mark or space signal depending on which of its two inputs, $\Delta M$ or $\Delta S$, is the larger. This data signal from 34 is passed to output lead 36 via switch 35, which is arranged so that it makes the connection indicated by the dashed line at the end of baud 1 and at the end of all other odd numbered bauds. Simultaneously, during baud 1, the M1 and S1 sections are tuned to the channel assignments of baud 2 and at the end of baud 1 the integrated energy of the M1 and S1 sections are applied to energy stores M11 and S11. During baud 2 the M1 and S1 sections are tuned to the current channel assignments and at the end of this baud the integrated received energies are applied to energy stores M12 and S12. Simultaneously, at the end of baud 2 the comparator 31 of the M1 and S1 sections compute the absolute value of the difference between the energy levels in the energy stores connected thereto, to produce $\Delta M$ and $\Delta S$ signals. Like comparator 34, comparator 33 puts out a binary signal of the same type as the larger of its two inputs, $\Delta M$ or $\Delta S$ and this data signal is passed to the output lead 36 via switch 35, which now connects the output of 33 to lead 36, as shown in the solid-line position in the drawing. The clock output switches 35 to the output of comparator 33 at the end of each even-numbered baud. The operation continues in this fashion, with the comparators 33 and 34 alternately supplying the data output to lead 36.

As stated above, with a steady jamming signal on any channel, the circuitry and method of FIG. 2 will always yield the correct bit. Assume first that the jamming signal phase cancels the desired signal. This means that during the preceding baud when one of the receiver sections is tuned to this desired frequency or channel, the jamming energy alone is present. This jamming energy will then be stored in one of the energy stores and no energy will be applied to the other energy store of that section, due to the phase cancellation. The comparator 31 will then put out the same signal ($\Delta M$ or $\Delta S$) as it would have had no jamming been present and the desired signal had been received during its proper baud. This follows since the comparators 31 take the absolute value of the difference between the stored energies. If the jamming signal is superimposed on the desired signal, the signal amplitude during the desired baud will exceed that of the preceding by the amplitude of the desired signal and the output of the comparator circuit 31 will equal the desired signal amplitude.

In the receiving apparatus and method illustrated in FIG. 4, circuit elemnts which perform the same function have been given the same reference characters as those of FIG. 2. The circuitry includes two paralleled sections, a mark section and a space section. The mark and space mixers 14 and 18 have applied to their signal inputs the output of the common RF circuitry 8 via lead 10. The frequency of the mark and space oscillators, 16 and 20 are controlled by the code or pseudo-random sequence stored in the key generator 39. The tuning of the mark oscillator 16 during any given baud is such that any incoming energy at the mark frequency or channel of that baud will be converted or heterodyned to the frequency, Fm, of the bandpass filter 11 of the mark section. Similarly any incoming energy on the space channel will be converted by the mixer 18 and space oscillator 20 to the frequency, Fs, of the bandpass filter 11 of the space section. Each of the mark and space sections is provided with a second bandpass filter 12 in parallel with the first bandpass filter 11. These filters 12 are tuned to an adjacent channel which is blank except for interference or jamming energy. The filter 12 of the mark section is tuned to $Fm \pm \Delta f$ and that of the space section to $Fs \pm \Delta f$. The outputs of all of the four filters 11 and 12 are amplified by elements 22 and then applied to integrate and dump circuits 13. The two integrate and dump circuits of each section are connected to the inputs of comparators 31. The outputs of the two comparators 31 are applied to a third comparator circuit 33, the output of which is the binary data signal lead 36. As in the embodiment of FIG. 2, the output of clock 37 is applied as a control or synchronizing signal to the key generator, the integrate and dump circuits and the comparator circuits. The operation of the receiver of FIG. 4 is as follows: During each baud, the filters 11 receive energy at the mark and space frequencies, whereas the adjacent channel filters 12 of each section receive interference, noise or jamming energy. In the technique embodied in this circuitry, a comparison is made between the received energy at the assigned mark and space frequencies of the baud and that received simultaneously at an adjacent blank channel. In the comparators 31 of each section, the energies of the two integrate and dump filters connected thereto are substracted one from the other and the absolute value of the difference obtained. This absolute value, which will always be a positive voltage, forms the output of the comparators 31. In the case of the mark section this absolute difference value is termed $\Delta M$ and in the case of the space section, $\Delta S$. The comparator 33 now puts out a binary data signal on lead 36 corresponding to the larger of $\Delta M$ or $\Delta S$. Thus if $\Delta M$ is larger, a mark signal would appear on 36 and if $\Delta S$ is the larger, a space signal would be generated on lead 36.

As stated earlier, the embodiment of FIG. 4 is useful where there is appreciable fluctuation in the jamming or interference energy between adjacent bauds. This circuitry will also yield the correct decision in the presence of broadband interference or jamming energy which covers both the desired channel and the adjacent "blank" channel.

While the invention has been described in connection with preferred embodiments, modifications thereof are possible without departing from the inventive concepts disclosed herein. Accordingly, the invention should be limited only by the scope of the appended claims.

What is claimed is:

1. A receiver for binary radio signals which are transmitted in the frequency hopping mode in which the mark and space frequencies are changed from baud to baud in accordance with a pseudo-random code, comprising, means to compare the energy contents of each mark and space channel with the energy contents of the same mark and space channels during the preceding blank baud, said means comprising comparator circuits for obtaining the absolute value of the difference between the energies of the current mark and space channels and stored values of the energy of the same channels during the preceding blank baud, and further comparison means connected to the outputs of said comparator circuits for producing a binary signal corresponding to the larger of said absolute values.

2. A receiver for binary radio signals which are transmitted in the frequency hopping mode in which the mark and space frequencies are changed from baud to baud in accordance with a pseudo-random code, comprising, common radio frequency circuitry, four sections having their inputs connected in parallel to the output of said radio frequency circuitry, two of said sections being tuned during any given baud to the current mark and space channel assignments of that baud and the other two of said sections being tuned to the channel assignments of the next succeeding baud, the tuning of each pair of said sections remaining constant during two successive bauds, each said section comprising comparison means for comparing the energy received during said given baud at the current channel assignment thereof with the energy received on the same channel during the preceding baud, resulting in mark and space energy differences, and further comparison means for comparing said mark and space energy differences, the larger of the two determining the type of signal received during said given baud.

3. The receiver of claim 2 wherein each said section comprises, a mixer, a bandpass filter and an integrate and dump circuit connected in cascade and a pair of energy stores connected to the output of each said integrate and dump circuits, said comparison means having a pair of inputs connected to the outputs of each pair of energy stores, and said further comparison means comprising a pair of comparator circuits each having two inputs and a single output, said last-named inputs being connected to the comparison means output of two of said sections.

4. The receiver of claim 3 wherein each of said mixers has an oscillator connected thereto, and a key generator connected to all of said oscillators, said key generator arranged to control the frequencies of said oscillators in accordance with a code stored in said key generator.

5. A method of detecting binary radio signals which are transmitted in the frequency hopping mode, comprising the steps of, first comparing the energy contents of each channel during the blank baud prior to the actual transmission with the energy content of each channel during the baud when transmission is expected, said first step resulting in the absolute value of the difference of said energies for both the mark and space channels and further comparing said differences of said energies of said mark and space channels and producing a binary signal corresponding to the larger of said two differences.

6. A receiver for binary radio signals which are transmitted in the frequency hopping mode comprising, means to compare and calculate the absolute value of the energy difference between the mark channel for the current baud and the energy received simultaneously on a nearby blank channel, similar means to compare and calculate the absolute value of the energy difference between the space channel for said current baud and the energy received simultaneously on another nearby blank channel, thereby obtaining mark and space energy differences, and means to produce a binary signal corresponding, to the larger of said mark and space energy differences.

7. A receiver for binary radio signals which are transmitted in the frequency hopping mode comprising, common broadband radio frequency circuitry, mark and space mixers connected in parallel to the output of said radio frequency circuitry, a first pair of bandpass filters connected in parallel to the output of said mark mixer, a second pair of bandpass filters connected in parallel to the output of said space mixer and integrate and dump circuits connected to the outputs of each of said filters, first comparator means connected to the outputs of the two integrate and dump circuits which are in cascade with said mark mixer and a second similar comparator means connected to the outputs of the other two of said integrate and dump circuits, and further comparator means connected to the outputs of said first and second comparator means.

8. The receiver of claim 7 wherein a mark oscillator is connected to said mark mixer and a space oscillator to said space mixer, and key generator connected to said oscillators and arranged to tune said oscillators such that one of said first pair of filters will receive the mark channel of the current baud and one of said second pair of filters will receive the space channel of the current baud, the other two filters being tuned to a nearby blank channel.

9. The method of detecting binary radio signals which are transmitted in the frequency hopping mode, comprising the steps of comparing and calculating the absolute value of the energy difference between the mark channel for the current baud and a nearby blank channel and simultaneously comparing and calculating the absolute value of the energy difference between the space channel for the current baud and a nearby blank channel, thereby obtaining mark and space energy differences, and producing a binary signal corresponding to the larger of said mark and space energy differences.

* * * * *